July 23, 1940.　　　C. F. VAN HOOK　　　2,208,914
PLANETARY STRANDING MACHINE
Filed Nov. 4, 1937　　10 Sheets-Sheet 1

INVENTOR.
Charles F. Van Hook
BY
his ATTORNEY.

July 23, 1940.  C. F. VAN HOOK  2,208,914
PLANETARY STRANDING MACHINE
Filed Nov. 4, 1937  10 Sheets-Sheet 4

INVENTOR.
Charles F. Van Hook
BY
his ATTORNEY.

July 23, 1940.  C. F. VAN HOOK  2,208,914
PLANETARY STRANDING MACHINE
Filed Nov. 4, 1937  10 Sheets-Sheet 5

INVENTOR.
Charles F. Van Hook
BY
his ATTORNEY.

July 23, 1940.                C. F. VAN HOOK                2,208,914
                         PLANETARY STRANDING MACHINE
                           Filed Nov. 4, 1937        10 Sheets-Sheet 6

INVENTOR.
                                    BY     Charles F. Van Hook
                                                     HIS ATTORNEY.

July 23, 1940.  C. F. VAN HOOK  2,208,914
PLANETARY STRANDING MACHINE
Filed Nov. 4, 1937   10 Sheets-Sheet 7

Fig. 7.

INVENTOR.
Charles F. Van Hook
BY
ATTORNEY.

July 23, 1940.    C. F. VAN HOOK    2,208,914
PLANETARY STRANDING MACHINE
Filed Nov. 4, 1937    10 Sheets-Sheet 9

INVENTOR.
Charles F. Van Hook
BY
his ATTORNEY.

July 23, 1940.   C. F. VAN HOOK   2,208,914
PLANETARY STRANDING MACHINE
Filed Nov. 4, 1937   10 Sheets-Sheet 10

INVENTOR.
Charles F. Van Hook
BY
his ATTORNEY.

Patented July 23, 1940

2,208,914

UNITED STATES PATENT OFFICE 2,208,914

PLANETARY STRANDING MACHINE

Charles F. Van Hook, Paterson, N. J.

Application November 4, 1937, Serial No. 172,674

10 Claims. (Cl. 57—13)

This invention relates to planetary stranding machines and has for an object to provide a machine of this character which lays the strands evenly, and with uniform back turn.

Another object of the invention is to provide a machine of this character having a complement of anti-friction bearings directly supporting its main central shaft.

Another object of the invention is to provide a stranding machine having anti-friction bearings for directly supporting the shaft by which the lay heads are carried, and having anti-friction bearings on the spiders of the heads for independently supporting the cradles, and anti-friction bearings on the cradles for supporting the spool spindles.

Another object of the invention is to provide a stranding machine which lays the strands evenly with uniform tension and back turn, it having anti-friction bearings for directly supporting the shaft by which the lay heads are carried, and having anti-friction bearings on the spiders of the heads for independently supporting the cradles, and anti-friction bearings on the cradles for supporting the spool spindles.

Another object of the invention is to provide in a planetary stranding machine a plurality of cradles, all of the cradles being individually geared to a common back turning mechanism, each of the cradles being mounted on anti-friction bearings, the back hung mechanism or gearing is so arranged that the spool axes may be varied from running always horizontal to earth during the cycle of machine rotation, or that it may tumble relative to earth.

Another object of the invention being to provide in a stranding machine, a main central shaft for carrying the spiders of the lay heads, directly supporting this shaft on bearings, mounting the cradles in the spiders on anti-friction bearings and having a back turning mechanism active upon all the cradles.

Another object of the invention being to provide in a stranding machine, a main central shaft for carrying the spiders of the lay heads, directly supporting the shaft on bearings, all the cradles being individually geared to a common back turning mechanism, each of the cradles being mounted on anti-friction bearings.

Another object of the invention is to provide, in a stranding machine, particularly one used in laying up metal strands, a device for stopping the machine upon the breaking of a strand, the mechanism also being organized to stop the machine if a spool delivers its strand faster than the delivery of the other spools.

Another object of the invention is to provide an improved cradle for use in stranding machines which is capable of receiving the spool when in a horizontal position.

Another object of the invention being to provide a spool spindle within a cradle having an overhung mounting, and capable while in a horizontal position of receiving a spool.

Another object of the invention is to provide a cradle having within it a spindle, the spindle being supported at one end, the free end of the spindle being supported by the closure or lid for the cradle.

Another object of the invention is to provide a spool spindle within a cradle, the spindle being mounted on anti-friction bearings designed for supporting the working load and designed for supporting the overhung end of the spindle, there being a bearing device carried by the lid or closure of the cradle for supporting the overhung end of the spindle.

In planetary stranding heads as used in the manufacture of wire rope, copper and other electrical cables, strands and ropes, the planetary or backturn action of the spool carrying cradles is utilized for controlling or removing the residual torsional twist of the wires or strands of which the strand or rope is composed. This type of machine has the advantage of closer control of these operations than the prior machines.

In a planetary stranding head the bobbins or spools or wire or strand are subjected to forces not encountered in other types, and the problem of restraining these forces, particularly the shock and suddenly-applied loads, is solved in this machine, rendering this feature a very important one.

In this new type of planetary head the various disadvantages of earlier designs are overcome.

The friction pulley which, in cradles having removable spindles, is removed with the spindle, is now permanently in place in the cradle, and its adjustment is made at the outside of cradle in the convenient location shown.

In the new cradle there are, therefore, no loose parts to be removed when loading or removing a spool, this results in a considerable saving of time in these actions.

The anti-friction construction throughout, with the spool slap and spindle end adjustment provided, reduce to a minimum the wear encountered in sliding parts and locks in previous cradles. In this new machine the cradles can be removed without disturbing the position of the spiders, each cradle having for its supporting end a removable pintle, this pintle being carried in a ball bearing carried in the spider of the rotor.

In this new machine the backturn is acomplished by suitable gearing at the entrance end of each series of cradles, the gearing, by means of suitable change gears, allowing variation of roll-over of the cradle respective to earth and rotor per turn of rotor; and also/or the desired backturn known as turn for turn, in which the spool axis remains always horizontal to earth throughout the cycle of rotation about the machine axis. All gears, including the sun gear of this train, are ball bearing mounted.

The planetary machines heretofore built have employed in the support of the rotor, roller pairs under the spider rims, these being required to support and stabilize their relatively heavy loads. By the use of very large bore anti-friction bearings with a shaft of suitable size, these rollers have been eliminated, thus resulting in greater stability and increased quiet operation of the machine. This large bearing is located so as to allow a reasonable length of lead of wire or strand to the closing lay head for the insertion of whatever special device it may be desirable to here employ.

In the drawings accompanying this specification one practicable embodiment of my invention is illustrated. In which drawings.

Figure 1:
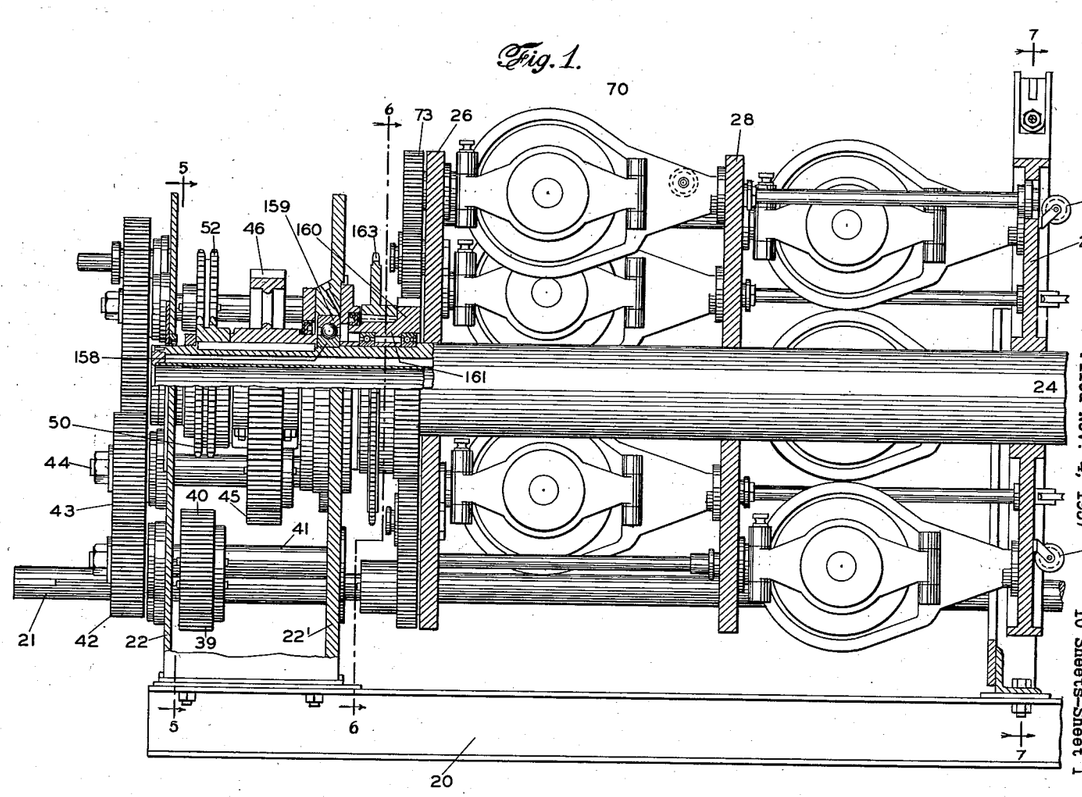
Figures 1, 2 and 3 show a side elevation, partly in axial section, of my improved stranding head, Figure 2 fitting between the right hand end of Figure 1 and the left hand end of Figure 3. Circles 17' and 18' have been dotted in at the left hand ends of Figures 2 and 3 for the purpose of representing the position of the sheaves 17 and 18 at the right hand ends of Figures 1 and 2 respectively.
Figure 2:
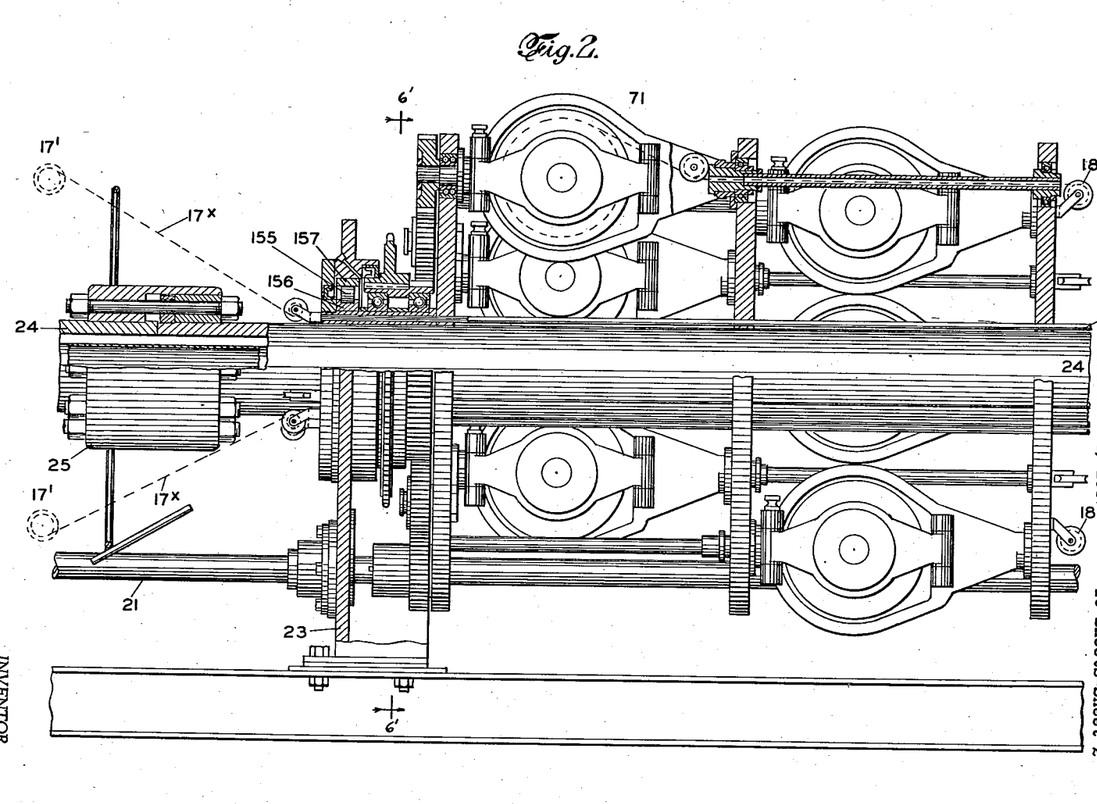
Figure 3:
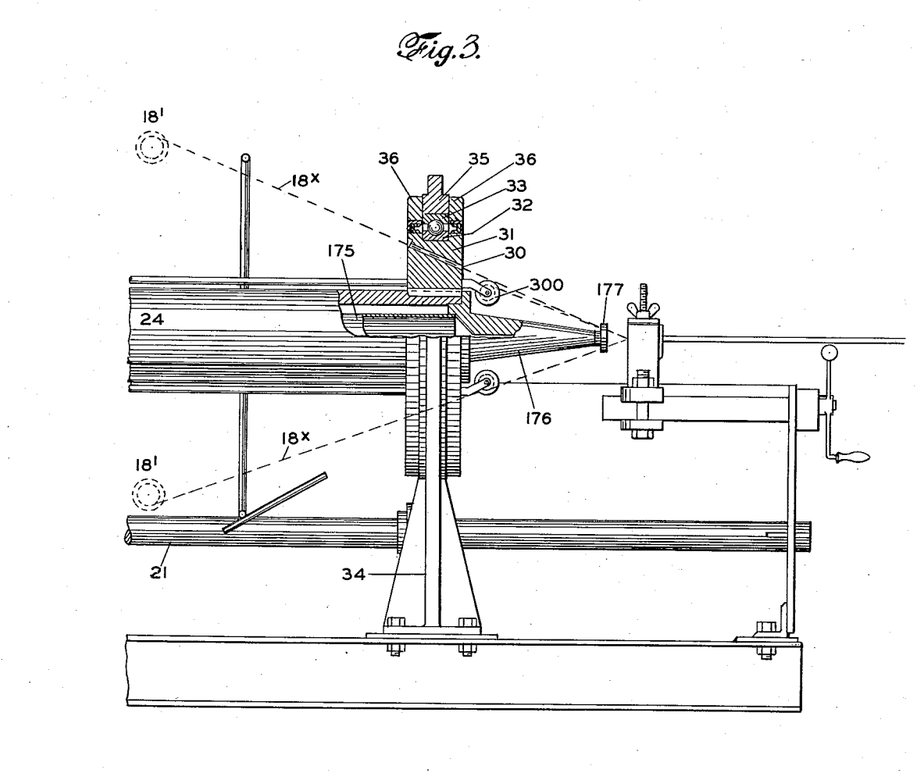
Figure 7:
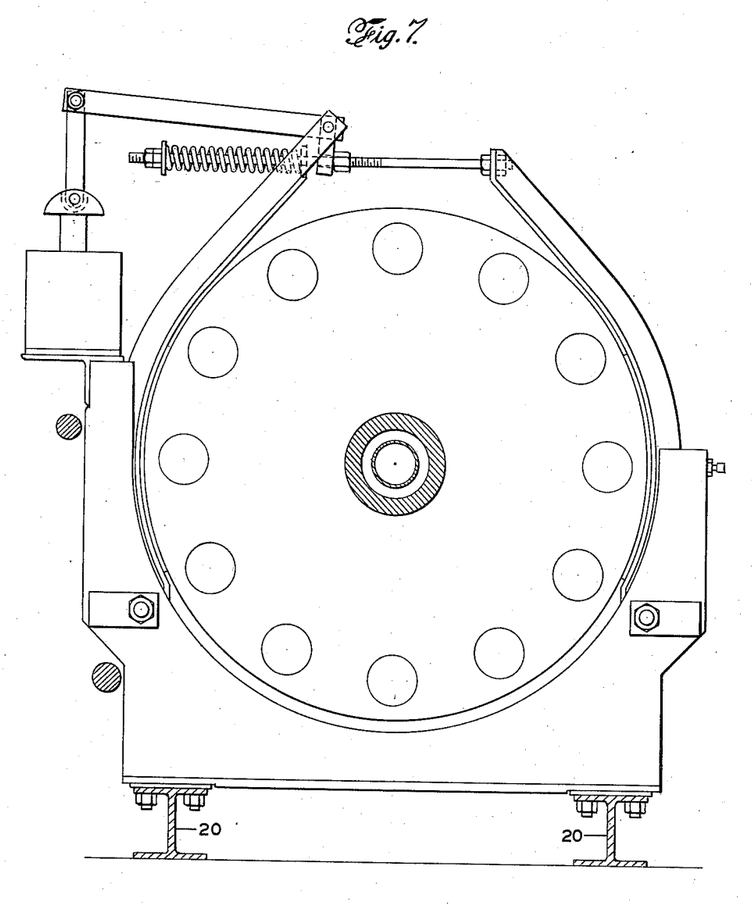
Figure 7 is a diagrammatic view cross sectionally of the machine at the right of the brake, looking from the entrance end of the machine, the plane being approximately represented by the line 7—7 and Figure 1.

In the description of this machine it will be assumed that the I beams, 20, one of which is shown in elevation in the assembly drawing contained in Figures 1, 2 and 3, and both of which are shown in Figure 7, rest upon a suitable floor or base foundations. The main driving shaft 21, receiving its power from some source, not shown, is supported in bearings mounted in uprights 22, 23 and 34, resting upon the I beams 20. In this present illustration two lay heads are shown, one being represented at the right hand end of Figure 1, and the other being represented at the right hand end of Figure 2. The emergence end of the machine and of the cradles and various parts is toward the right, and for the purpose of distinction the other end of the cradles, etc., and of the machine might be termed the back end, altho this may not be in strict accordance with the term employed in the trade. The lay heads or the spiders which form part of them are mounted for rotation on a main central shaft 24, which is shown as tubular. It is preferably made up of two sections held together with a shaft coupling device shown in the left hand end of Figure 2, and indicated by the reference character 25. Since this coupling device forms no part of the present invention I will not describe its construction. This shaft being of large outside diameter in relation to the parts which it carries is mounted on a complement of anti-friction bearings having large bores. These bearings will be described in detail later.

The lay heads, of which there are two in the present illustration, are practically the same, and a description of one will be ample it is believed for a correct understanding of the invention. With the exception of the breaking device illustrated at the right hand end of Figure 1, the lay heads are the same, the mounting of the cradles being shown in elevation in both views. In Figure 2 the mounting for the cradle in the upper part of the rear bay is shown in axial section to disclose the emergence tube and the ball bearings upon which the cradle is mounted. For supporting the cradles of each lay head there are represented three spiders secured to the central shaft 24, a rear spider 26, a spider 27 at the emergence end, and a spider 28 located between these. The spiders in the illustration are plates. The strands from the cradles in the head shown in Figure 1 pass over the sheaves 17, which are shown at the left hand end of Figure 2 in dotted lines indicated by the reference character 17', the strands being here indicated as 17' pass thru tubes 29 to the emergence end of the machine and over sheaves 300. The strands from the second head pass over sheaves 18, represented in dotted lines at the left of Figure 3 and indicated by the reference character 18', these strands being indicated by the reference character 18x, pass thru oblique openings 30 formed in the enlarged collar 31, carrying the emergence end of the main central shaft 24. This collar has formed in its perimeter a groove for receiving the inner race 32 of a ball bearing, such race having an enlarged bore, the outer race 33 of the bearing being supported in a hub 35, carried by the standard 34, the bearing being held in place by suitable side plates 36 clamping the sides of the outer ring 33, and the outer face of hub 35 of the standard 34.

Figure 4:
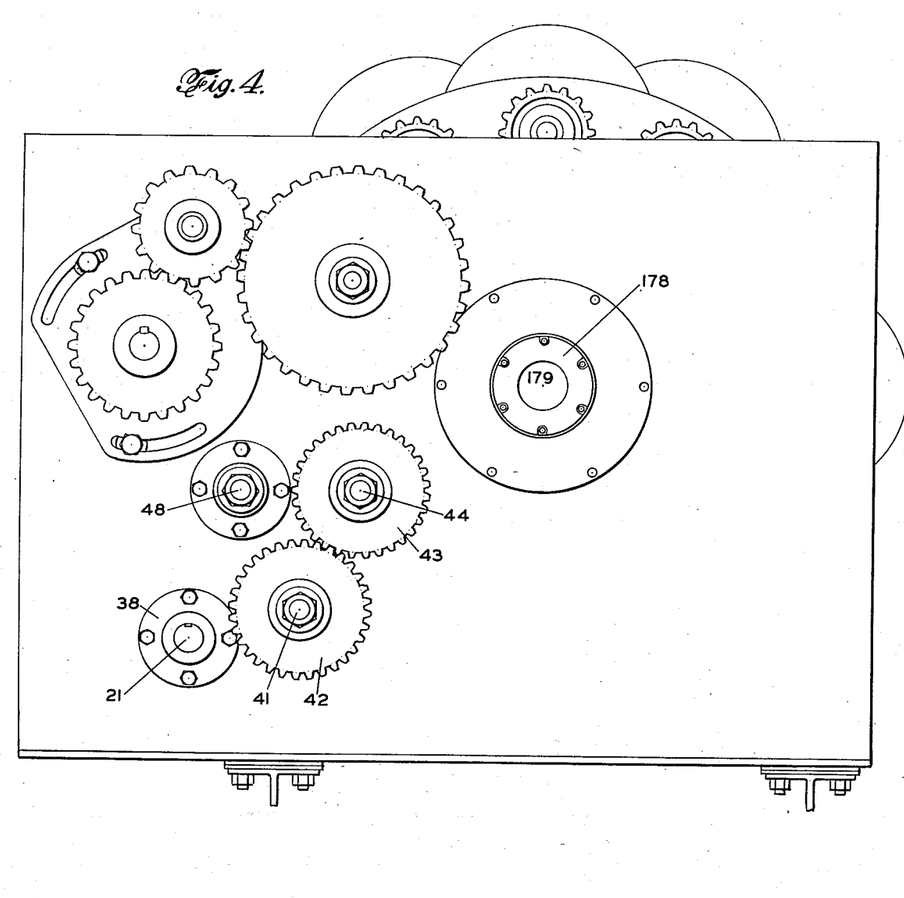
Figure 4 is an elevation of the entrance end of the machine, looking at this from the left hand end of Figure 1, showing among other things the change gears.

The main or line shaft 21 is shown entering the gear box 37 thru a suitable stuffing box 38, see Figure 4. Within the gear box 37, see Figure 5, the shaft 21 is shown carrying a gear wheel 39, meshing with a gear wheel 40, mounted on a shaft 41 upon the outer end of which shaft is mounted a gear wheel 42, meshing with a gear wheel 43, mounted on shaft 44, which carries within the gear box a gear wheel 45, which is in mesh with a larger gear wheel 46, mounted on the main central shaft 24. The gearing between the line shaft 21 and the shaft 24 which controls the head direction, is a change gear having interchangeable members for changing the speed and the direction of the rotation of the lay heads.

Figure 5:
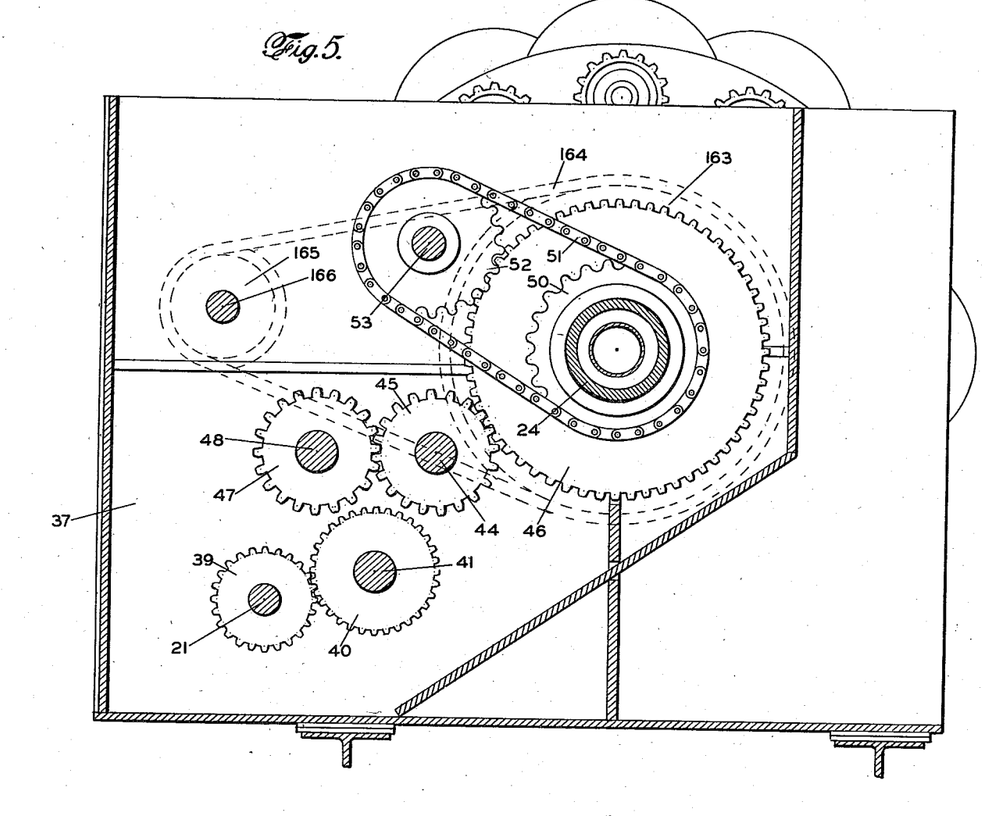
Figure 5 is a cross sectional view taken on a plane at about the lines 5—5 of Figure 1 through the gear casing.

The gear wheel 45 is shown in Figure 5 as also being in mesh with a gear wheel 47, mounted on a shaft 48. The gear 47 through the idler gear 45, drives the gear 46. Or the gear 45, when active drives the gear 46.

The main central shaft 24 is shown carrying a sprocket wheel 50, which is connected by means of a chain 51 with a sprocket wheel 52 mounted on a shaft 53.

Figures 8, 9:
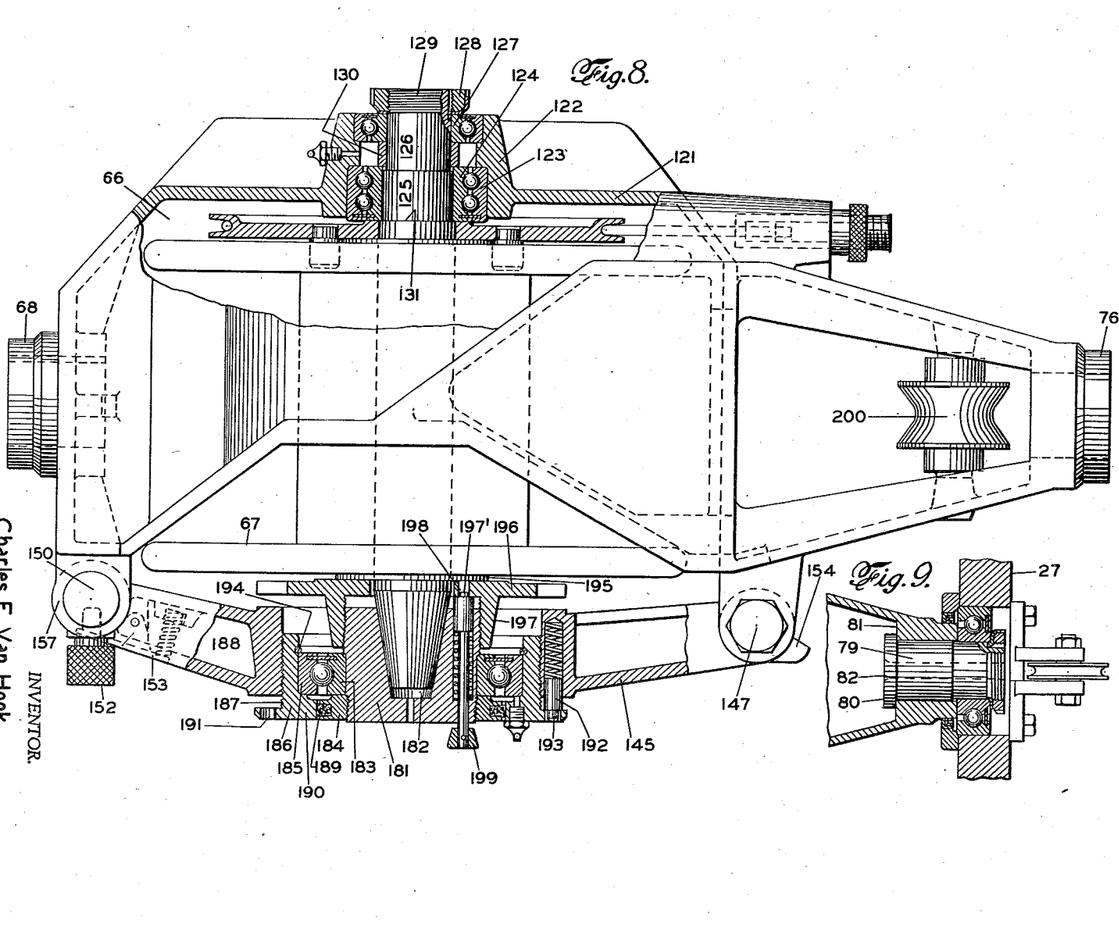
Figure 8 shows one of my improved cradles, it being a view which although of a rotary part may be termed for purposes of this description a top view partly in section on a horizontal plane.
Figure 9 is a view of the delivery end of the cradle and its supporting bearings, partly on a similar horizontal section.
Figure 10:
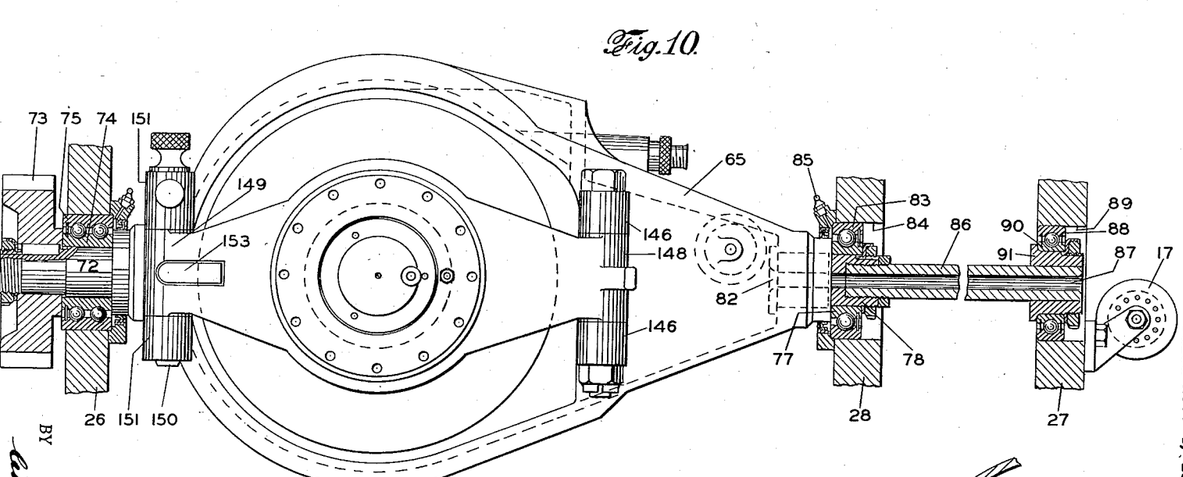
Figure 10 shows an elevation of one of the cradles of the group of six located at the entrance end or bay of each of the two illustrated lay heads, this view showing in axial section at its right hand end a long emergence tube and at the driven end a short shaft connecting the end of the cradle to its planetary pinion, this view also showing in axial section the anti-friction mounting for the nose of the cradle, the emergence tube and the pinion shaft.

My improved cradle construction, illustrated herein as comprising a boat shaped body portion 65, which is preferably formed of a casting, has within it a central chamber 66 for receiving a spool, such as is illustrated in Figure 8 by 67. The back end of the cradle is formed with a hub 68, in which there is mounted a shaft carrying member 69, see Figures 10 and 11. The rear end of each of the cradles located in the rear bay, which is indicated in Figure 1, by the reference character 70, and in Figure 2, by the reference character 71, such bays being between the rearmost spiders and the centrally disposed spiders; is shown mounted on a shaft 72, carried by the rear of the cradle, it being comparatively short and connected directly to one of the pinions 73 of the back turning mechanism. There is shown mounted between the hub of the pinion 73 and the rear end member 68 of the cradle the inner ring 74 of a ball bearing which is mounted directly on the back turning shaft 72, the outer ring 75 of the ball bearing being mounted directly on the spider 26. The nose 76, of the cradle which of course is the emergence end, is in the case of the cradles in the rear bay, mounted on a ball bearing whose inner race 77 is mounted on the end of a plug 78 which extends from the nose, and has a flange, shown in dotted lines in Figure 10, which plug is quite similar to the plug shown in Figure 9. Figure 9 shows the mounting for the noses of the cradles on the emergence bay. The plug in Figure 9 has a body portion 79, the flange 80 engaging the shoulder 81 within the cradle, the emergence tube or passage 82 is shown in dotted lines in Figure 9, and partly in dotted lines and partly in full lines in Figure 10. The outer race 83 of this nose supporting bearing is shown in Figure 10 mounted in a cylindrical bore 84 found in the spider 28. This affords longitudinal freedom of the parts supported by the bearing. The bearing is shown of the enclosed type, a lubricant supplying device being represented at 85. An emergence tube 86 is shown threaded into the forward end of the plug 78, and having its bore 87 serve as a continuation of the bore 82. The emergence ends of this tube is shown supported in the spider 27 by means of a ball bearing, the outer race 88 of such bearing being mounted in a cylindrical bore 89 formed in the spider 27, the inner race 90 of the bearing being mounted on a suitable block 91. The strand passes out of the emergence tube 87 over a sheave 17, (assuming that we are considering the first lay head).

The elongated emergence tube 87 in extending from the spider 28 to the spider 27 passes through the bay at the emergence side of the lay head and alternates with the cradles in the emergence side.

Figure 11:
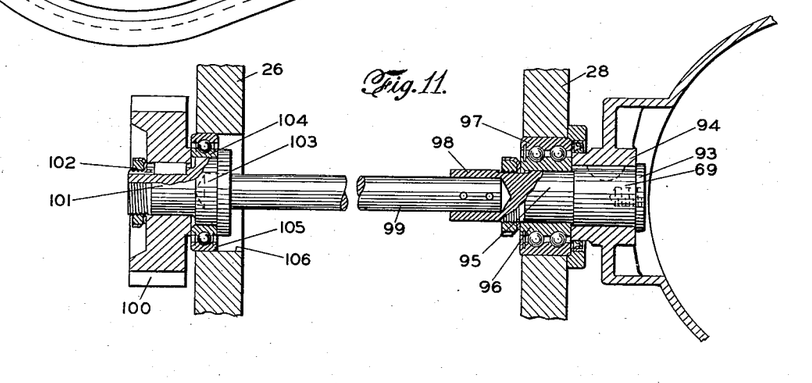
Figure 11 shows in section the pinion end of one of the cradles of the group located at the emergence end or bay of a lay head and a long shaft connecting the end of the cradle to its planetary pinion, also the antifriction bearings in axial section.

The mounting for the nose ends of the cradles in the emergence bay is illustrated in Figure 9. The mounting for the entrance or rear ends of the cradles in this bay is illustrated in Figure 11. The short shaft 69 has a head 93 which engages against a shoulder 94 formed in the rear end of the cradle. As this shaft will be the driver for the cradle in the back turning operation, it is shown as held in place by a key illustrated in dotted lines. This shaft has a reduced rearwardly extending part 95 upon which is shown mounted the inner ring 96 of a ball bearing, the outer ring 97 of which is shown slidable in an opening in the spider 28. A still further extension 98 of this shaft extends into the rear bay and has an opening for receiving the driving shaft 99. These shafts 99 alternating with the cradles in the rear bay in the same manner that the emergence tubes 86 alternate with the cradles in the emergence bay.

The shaft 99 is connected to one of the planetary gears 100 of the back turning gearing. The back end of the shaft is shown slidable in a mounting device 101 which is shown keyed to pinion 100 and also locked in position by means of a suitable nut 102. This mounting device has a portion forwardly of the hub of the pinion 100 designated as 103 upon which the inner ring 104 of a ball bearing is mounted. The outer ring 105 of such ball bearing being shown mounted in a cylindrical opening 106 of the spider 26.

Figure 12:
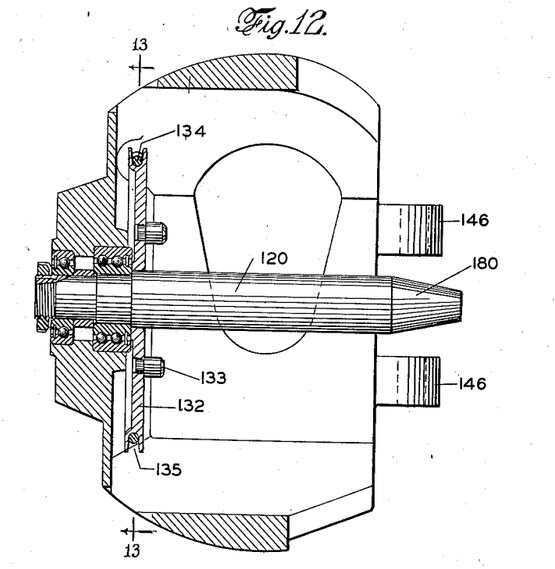
Figure 12 is a cross section of the cradle showing the overhung mounting of the spool carrying spindle when it is free, not only of a spool but also of the bearing for its outer end which is carried by the lid or closure of the cradle, the cradle is represented in the open position, the lid not being shown at all, the hinge members for it on the cradle, however, are shown.
Figure 13:
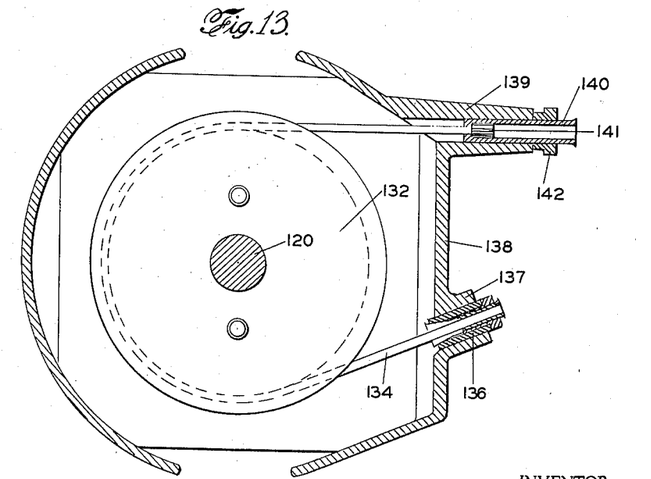
Figure 13 is a view illustrating means for applying frictional tension to the individual spools, particularly during the running operation, this view is taken at about the plane of the line 13—13 of Figure 12.

The cradle bodies are practically the same for both bays in both heads. The spool carrying spindle designated by the reference character 120 may be seen in elevation in Figure 12, in cross section in Figure 13 and partly in elevation and partly concealed by the spool 67 in Figure 8.

The inner wall 121 of the cradle supports the inner end of the spindle. This inner wall is shown as formed with a substantial hub 122 in which there are mounted two anti-friction bearings. The portion of the hub which is substantially in the plane of the wall 122 is shown carrying the outer ring 123 of a two row ball bearing. The center plane of the wall 121 passes between the rows of balls, preferably with the row of balls nearer the chamber 66 being a little further back of a symmetrical position. The inner race ring 124 of this bearing is shown mounted upon a reduced portion 125 of the spool spindle. This spindle is further reduced towards its end, making a portion 126 upon which the inner ring 127 of a ball bearing is mounted, this latter bearing being locked in position by means of a nut 128. Mounted upon the screw threaded portion 129 at the very end of the spindle there is shown interposed between the inner race rings 127 and 124 a spacer sleeve 130 through which the nut 128 may press ring 124 against the shoulder 131 at the inner end of the reduced portion 125.

There is shown fast on the spool spindle a friction drum 132 which preferably is pressed tightly up against this inner bearing ring 124, this friction member is shown carrying pins or lugs 133 for engaging suitable openings in the spool.

Friction is applied to the spool for the purpose of putting a proper tension upon the strand which it carries and passes off by means of a belting member 134 which may be a piece of round leather belting, it being received in a deep groove 135 in the perimeter of the member 132. By reference to Figure 13 it will be seen that the preferred way of mounting this friction applying device is to mount a collet 136 in a hub member 137 formed in the end wall 138 of the cradle, the opening of the hub preferably slanting downwardly and being located above the lower part of the member 132. The friction band 134 makes a little more than a half turn around the member 132 and passes out through a sleeve 139 within which is mounted an inner thimble 140 having an opening at its end for the passage of the belt, the belt being furnished within the hollow of the thimble with an enlargement 141. The outer surface of the thimble is screw threaded for the engagement of a nut 142.

The outer end of the spool spindle 121 is supported when the machine is in working position by means of an anti-friction bearing device carried by the lid or closure 145. The lid is shown pivoted to hinge members 146, preferably located at the emergence end of the cradle, a suitable pin 147 passing through these hinge members and through the hinge member 148 formed in the lid. The free end of the lid has an eye member 149 through which a locking pin 150 passes, the pin going through suitable eye members 151 formed on the rear portion of the cradle. The pin 150 is held in its open and in its closed positions by means of a detent 152. A latch device is illustrated at 153 for holding the pin 150 in its elevated position. The hinged end of the lid is shown furnished with a stop device 154 for limiting the opening movement of the lid.

The outboard end of the spool spindle 120, which is the free end when the lid 145 is open, must of course be supported when in this free position, the ball bearing represented at 127 is for the purpose of sustaining the overload, the bearing 123—124 takes the working load at the inner end of the spindle, the other bearing assisting in a way in this work, but being primarily intended for supporting the outer overhung end of the spindle. The spindle at its outer end is shown of conical formation at 180, this not only assists in passing a spool on to the spindle, but also assists the spindle in finding a seat in the outer supporting device, which is carried by the lid through the intermediation of an anti-friction bearing. A substantial block is formed with a conical seat 182 having a cone angle of proper relation to the cone angle of the spindle end 180, the block 181 shown having secured to its outer perimeter the inner race 183 of a ball bearing. The inner race of the bearing ring 183 engages a shoulder against which it is pressed by means of a screw ring 184. The outer race ring 185 of the bearing is mounted in a ring member 186, such ring member having a screw threaded exterior 187 which engages a screw threaded opening 188 in the lid. Packing 189 is disposed between the outer surface of the screw ring 184 and an inwardly directed flange 190 on the ring member 186. A number of holes 191 are formed in the outwardly directed flange of the member 186, these holes are for the purpose of receiving a pin wrench for screwing the member 186 in and out, and within the block 181, this being for the purpose of adjusting the pressure which is exerted by the lid on the end of the spool spindle. A spring pressed plunger 192 is carried in a suitable socket in the lid and is furnished with a pin portion 193 for engaging in one or another of the holes 191, for holding the member 186 in its position of adjustment.

The bearing ring 185 is prevented from outward movement by means of a shoulder on the inside of the flange 190, and is prevented from inward movement by means of a spring ring 194 seated in a groove formed in the bore of this member 186.

For the purpose of adjusting the amount of pressure which is exerted on the end of the spool, or in practice on the plate 195, which is customarily placed upon the end of a spool, an adjusting device is provided in the form of a plate 196, which has a screw threaded flange 197 engaging the screw threaded exterior of the inner portion of the block 186. The outer edge of this plate 196 is serrated for the engagement of the fingers of the operator. This plate is held in its adjusted position by means of a spring pressed plunger having a pin portion 19$^x$ entering one or another of a suitable row of holes 198 formed in the plate 196. The outer end of the pin 19$^x$ is furnished with a head 199 so that the operator may withdraw the pin from the engagement with the holes 198 and screw the sleeve 198 up or down as occasion may require.

In practice there is very little occasion for adjustment of the block 181 in or out after the first adjustments have been made, but owing to the variation in spool lengths the operator of the machine will have frequent occasions to adjust the location of the plate 196.

The emergence end of the cradle illustrated in Figure 8 is shown provided with a sheave 200, over which the strand from the spool which it carries will pass before entering the bore 82 of the block located within the nose of the cradle.

The main shaft 24, which constitutes the center of the rotor is supported by anti-friction bearings. The bearing 32—33 for supporting the emergence end of the shaft in the upright 34 has been described. The central portion of the shaft as shown in Figure 2 is mounted on cylindrical rollers 155 located between an inner race 156 mounted directly on the shaft and the outer race 157, which is mounted in the upright 23. It will be noted that the inner race 156 is provided with flanges at the ends of the roller, but that the outer race 157 is cylindrical. This permits longitudinal movement of the shaft in relation to the center support 23.

At the entrance end of the machine the shaft 24 is shown supported by a large ball bearing, there being an inner race ring 158 and an outer race 159 mounted in the rear wall 22' of the gear casing box. It will thus be seen that the rotor is carried entirely on bearings on its main shaft, thus eliminating the old style of support in which rollers running upon the periphery of the spider supported the weight of the rollers. This old style of support was in addition to being very noisy very difficult to maintain alined in a long rotor where more than one pair of these rollers were used.

Figure 6:
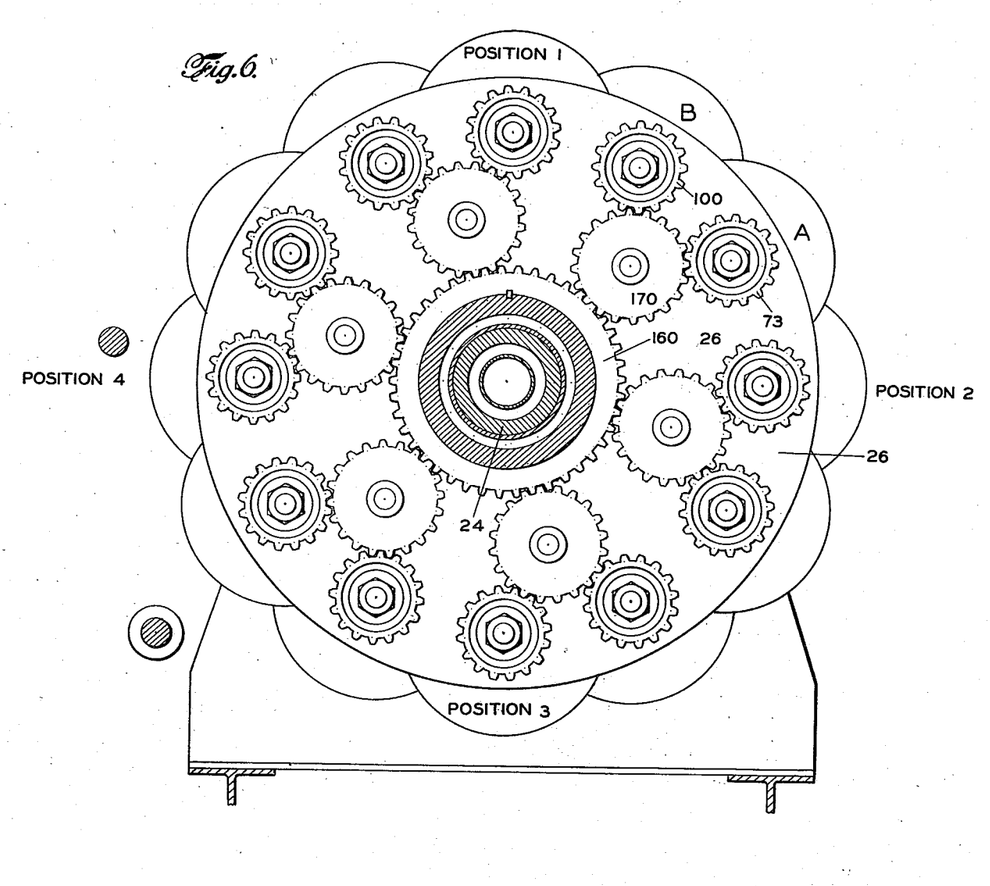
Figure 6 is a cross sectional view taken on a plane at about the line 6—6 of Figure 1, showing the planetary gearing for controlling the backturn speed of the cradles. This view represents also a cross section taken at about the plane 6' of Figure 2, showing the planetary gearing for the second lay head.

The planetary gearing for effecting the back turn or roll over of the cradle may be seen in end elevation in Figure 6. The sun gear is indicated by the reference character 160, and its hub 161, which is somewhat elongated, is carried by a pair of anti-friction bearings mounted on the main shaft 24. The sprocket wheel 163 is keyed to this hub for driving the sun gear, the sprocket wheel being driven by means of a chain 164, which is driven from a sprocket wheel 165, fastened on the shaft 166, which is driven by the gear wheels 168 and 169.

The sun gear 160 is shown in Figure 6 as being in mesh with a number of gears 170. According to the present layout shown herein each of the lay heads carries twelve cradles, these being divided into two bays, it is found convenient to have six of the pinions 170 each running upon a planet gear from each of the bays. In the present showing the planet wheel 73 is connected to a cradle in the entrance bay and planet wheel 100 is connected with the planet wheel of the emergence bay. The cradles of these two bays being indicated by the reference characters A and B respectively.

In a planetary head the spool load in one revolution or cycle of the rotor, which may be indicated in Figure 6, as the spider 26 exerts its centrifugal force at the spool position at the highest vertical point of rotation and weight effects in the sequence of:

Position 1.—Centrifugal force minus spool load upward from the earth, at the spool position at highest vertical point of rotation, to Position 2.—Centrifugal force outward horizontally from rotor axis with spool load acting downward at the horizontal extremity of the circle, to Position 3.—Centrifugal force and spool load downward at the bottom point of rotation, to Position 4.—Centrifugal force outward horizontally from rotor axis at the other horizontal extremity of the circle, and then back to (1).

There is shown within the tubular main shaft a tubular guiding member 175 which at the emergence end is supported by the nose member 176, which nose member at its extremity is furnished with the plate 177 through which all the strands converge in a well known manner. At the entrance end of the machine this tube 175 is supported by a removable plate 178, which has an opening 179, permitting the entrance of a core if one is to be used in the laying up operation.

I claim:

1. In a stranding machine, the combination with a spool supporting member, of a spool support, and anti-friction bearings for such support at one end thereof the other end of the support being free, and a gate for such support having an anti-friction bearing for engaging the free end of the support.

2. In a stranding machine, the combination with a spool supporting member, of a spool support, and anti-friction bearings for such support at one end thereof comprising a bearing for sustaining the running load and a bearing for sustaining the load when the lid is opened, and a lid for such support having an anti-friction bearing for the free end of the support.

3. In a stranding machine, the combination with a spool supporting member, of a spool support, and a closure for such member having means for removing the play of the spool along its supporting member.

4. In a stranding machine, the combination with a spool supporting member, of a spool support, and anti-friction bearings for such support at one end thereof, a closure for such support having an anti-friction bearing for the free end of the support, and means for taking up the play of the spool support.

5. A spool cradle, a spool supporting spindle carried thereby at one end, and normally fastened thereto, and a cover normally having no loose parts, and having a member for engaging the free end of said spindle.

6. In a stranding machine, the combination with a spool supporting member, of a spool support, and anti-friction bearings for such support at one end thereof, the spool supporting member being geared to remain in a horizontal position, and a cover normally having no loose parts, and having a member for engaging the free end of said spindle.

7. In a stranding machine, the combination with a spool support, and antifriction bearings for such support at one end thereof, the other end of the support being free, the spool supporting member being adjustably controlled in its rate of rotation relative to the earth by gearing, and a gate for the said support having an anti-friction bearing for engaging the free end of the support.

8. In a stranding machine, the combination with a spool support, and antifriction bearings for such support at one end thereof, the other end of the support being free, the spool supporting member being adjustably controlled in its rate of rotation relative to the earth by gearing, and a gate for the said support having means for engaging the free end of the support.

9. In a stranding machine embodying a frame, the combination with a continuous main horizontal shaft, of antifriction bearings concentric with and supporting the shaft, a number of layheads on the shaft, each layhead embodying means for carrying a plurality of cradles, cradles mounted on each layhead and having no parts removable for spool loading, planetary gearing driving the layheads, there being active change-speed means in stationary location capable of causing all the cradles to spin in unison either horizontal relative to earth or to spin at a variable rate.

10. In a stranding machine embodying a frame, the combination with a main central shaft and means for supporting the shaft from the frame, of a number of layheads, each comprising: spiders fast on the shaft, cradles mounted on the spiders, planetary gearing carried in part by the spiders and in part by the frame for back turning the cradles to turn in unison, and change gears for allowing variation of roll-over of the cradles respective to earth.

CHARLES F. VAN HOOK.